United States Patent [19]

Kanda et al.

[11] 4,386,530
[45] Jun. 7, 1983

[54] ULTRASONIC IMAGING EQUIPMENT

[75] Inventors: Hiroshi Kanda, Tokorozawa; Isao Ishikawa, Hino; Toshio Kondo, Kunitachi, all of Japan

[73] Assignee: Hitachi, Ltd., Tokyo, Japan

[21] Appl. No.: 226,820

[22] Filed: Jan. 21, 1981

[30] Foreign Application Priority Data

Jan. 21, 1980 [JP] Japan ................................. 55-4623

[51] Int. Cl.³ ..................... G01N 24/04; G01N 29/04
[52] U.S. Cl. ........................................ 73/613; 73/615
[58] Field of Search .................. 73/613, 614, 615, 616

[56] References Cited

U.S. PATENT DOCUMENTS

| 3,090,224 | 5/1963 | Rankin | 73/615 |
| 3,147,613 | 9/1964 | Kirkhope | 73/614 |
| 3,857,052 | 12/1974 | Beller | 73/620 |
| 4,054,053 | 10/1977 | Yamamoto et al. | 73/614 |
| 4,168,629 | 9/1979 | Bulteel | 73/615 |
| 4,198,866 | 4/1980 | Birjukov et al. | 73/613 |
| 4,267,732 | 5/1981 | Quate | 73/606 |

FOREIGN PATENT DOCUMENTS 55-128152 10/1980 Japan .

Primary Examiner—Anthony V. Ciarlante
Assistant Examiner—David V. Carlson
Attorney, Agent, or Firm—Antonelli, Terry & Wands

[57] ABSTRACT

An ultrasonic imaging equipment employing a transducer which includes an acoustic propagating medium formed with a concave surface at one end thereof and formed with a piezoelectric thin film on the other end thereof opposing to the one end, and a medium arranged in the concave surface in order to permit the concave surface to effect a lens action, and a dummy transducer which eliminates a transmitted echo and an echo from the lens boundary and which is constructed of the acoustic propagating medium and an acoustic absorber.

6 Claims, 7 Drawing Figures

ULTRASONIC IMAGING EQUIPMENT

BACKGROUND OF THE INVENTION

1. Field of the Invention

This invention relates to an imaging equipment employing ultrasonic energy, and more particularly to an acoustic microscope.

2. Description of the Prior Art

In recent years, it has become possible to generate an ultrasonic wave having as high a frequency as 1 GHz and hence to realize an ultrasonic wavelength of approximately 1 $\mu$m in the water. As a result, an acoustic imaging equipment of high resolving power has been fabricated. In the equipment, a collimated acoustic beam is formed by the use of a concave lens, and a high resolution attaining to 1 $\mu$m is realized.

A specimen is inserted in the beam, and an acoustic wave reflected by the specimen is detected to obtain information expressive of the elastic properties of the specimen, or the specimen is mechanically scanned to prepare an image.

Problems in the case of obtaining the ultrasonic image in this way will be described with reference to FIGS. 1 and 2.

FIG. 1 is a diagram which shows the schematic construction of a transducer for obtaining a reflected signal from a specimen. In the figure, an acoustic propagating medium (a cylindrical crystal of, for example, sapphire or silica glass) 20 has one end face optically polished into a flat surface and the other end face formed with a semispherical hole 30. A piezoelectric thin film 10 is deposited on the flat surface of the crystal 20. An RF pulse acoustic wave which is a plane wave is radiated into the crystal 20 by an RF pulse electric signal applied to the piezoelectric thin film 10. The plane acoustic wave is collimated onto a specimen 50 situated at a predetermined focus, by a positive lens which is formed of the interface between the spherical hole 30 and a medium (in general, water) 40 (accordingly, the spherical hole becomes the aperture of the lens). An acoustic wave reflected by the specimen 50 is collected and converted into a plane wave by the same lens, and the plane wave is propagated through the crystal 20 and is finally converted into an electric signal by the piezoelectric thin film 10. These circumstances are observed in a video frequency range as illustrated in FIG. 2. Here, the axis of abscissas represents the time, and the axis of ordinates the intensities of signals. Letter A indicates a transmitted echo, letter B an echo from the lens boundary 30, and letter C a reflected echo from the specimen 50. The reflected echo C varies depending on the acoustic properties of the specimen or through the scanning of the specimen, whereas the echoes A and B are inherent to the transducer and are constant. In detecting the reflected echo C, the presence of the echoes A and B incurs the following disadvantages:

① It becomes an obstacle in case of performing the time gating.

② The saturation of a receiver amplifier takes place, and the recovery time of the amplifier attendant thereupon is caused.

In this manner, the echoes A and B other than the reflected echo C from the specimen act as unwanted or parasitic peak signals in the case of obtaining the ultrasonic image.

Heretofore, in order to eliminate the unwanted or parasitic peak signals, the time gating has been relied on. However, when the aperture of the lens is small, the echoes B and C come close to each other and are very difficult to discriminate.

The reason is that, in order to enhance the resolving power of the imaging system, the frequency needs to be raised, which however gives rise to a great decay of the acoustic wave in the propagating fluid.

SUMMARY OF THE INVENTION

This invention has been made in view of the drawbacks described above, and has for its object to provide an ultrasonic imaging equipment which has eliminated unwanted echoes hampering the detection of a reflected echo from a specimen.

This invention for accomplishing such object is characterized in that signals corresponding to unwanted signals are generated and are subtracted from received signals.

Hereunder, this invention will be described with reference to the drawings.

DESCRIPTION OF THE PREFERRED EMBODIMENTS

Figure 3:
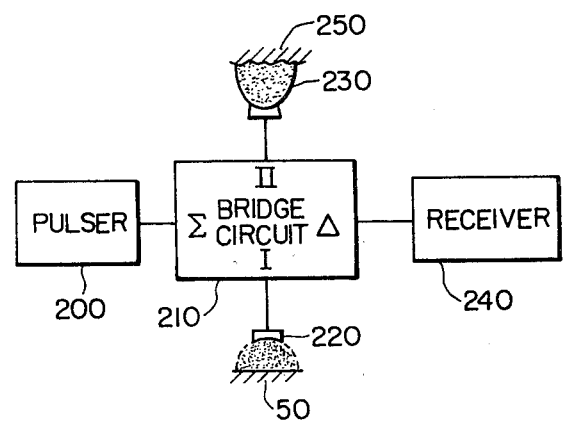
FIG. 3 is a diagram showing the construction of an embodiment of this invention.

FIG. 3 is a diagram showing the construction of an embodiment of this invention, and the embodiment is particularly suitable for a case of eliminating unwanted or parasitic peak signals in an RF frequency range. In the figure, numeral 200 designates a pulser which generates pulses at an RF frequency, and numeral 210 a bridge circuit which has a $\Sigma$ termination, a $\Delta$ termination, and side terminations I and II. Here, the bridge 210 can distribute RF power applied to the $\Sigma$ termination, to the side terminations I and II in phase and in equal parts and simultaneously derive from the $\Delta$ termination the difference between the powers applied to the side terminations I and II. It is commercially available ordinarily under the designation of "hybrid". Numeral 220 indicates the same transducer as that shown in FIG. 1 for obtaining the ultrasonic image of a specimen 50. Numeral 230 indicates a dummy transducer for generating signals corresponding to unwanted signals. It has the same construction as that of the transducer in FIG. 1 except that the specimen is replaced with an acoustic absorber (for example, a rubber material) 250. An acoustic absorber is seen as any material which provides substantially less reflection as compared with the reflection of the specimen 50 under examination. Shown at 240 is a receiver.

Figure 4A:
FIGS. 4(a)–4(c) are diagrams showing echo waveforms for explaining the operation of the embodiment.
Figure 4B:
Figure 4C:
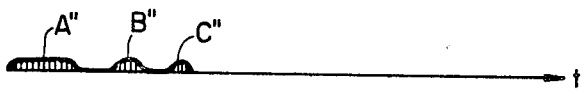

In such construction, the RF pulses are impressed on the $\Sigma$ termination of the bridge circuit 210 from the RF pulser 200, the transducer 220 and the dummy transducer 230 are respectively connected to the side termination I and the side termination II, and the $\Delta$ termination is connected to the receiver 240. Owing to the operation of the bridge 210, the RF pulses impressed on the Σ termination are equally applied to the transducers 220 and 230. Waves reflected from these transducers become as shown in FIGS. 4(a) and 4(b). As illustrated in FIG. 4(a), the reflected wave from the dummy transducer 230 does not include a refected echo from the specimen but includes a transmitted echo A and an echo B from the lens boundary. As illustrated in FIG. 4(b), the reflected wave from the transducer 220 includes echoes A', B' and C'. Since the difference between the reflected signals at the two side terminations I and II is provided from the Δ termination of the bridge 210, the transmitted echoes A and A' and the echoes from the lens boundaries B and B' which are common to both the reflected signals are canceled down to a proportion determined by the directivity (usually, 40 dB) of the bridge circuit 210. Accordingly, as illustrated in FIG. 4(c), the ratio of amplitudes among the reflected signal C' from the specimen 50 and the unwanted signals A' and B' is sharply improved, and echoes A'', B'' and C'' are obtained. In some cases, impedance matching circuits such as stub tuners may be interposed between the side terminations I and II of the bridge and the transducers 220 and 230.

In the above, in constructing the dummy transducer, the dummy transducer which exploits the property of the acoustic wave that the acoustic wave is absorbed and which uses the absorber to generate only the signals corresponding to the unwanted signals has been referred to. However, this invention is not restricted thereto, but it is also applicable to a case where the dummy transducer is constructed by employing a material identical in properties to the specimen 50. In this case, the same echoes A', B' and C' as shown in FIG. 4(c) are generated from each of the dummy transducer 230 and the transducer 220. Herein, however, the specimen 50 of the transducer 220 is moved under the mechanical scanning, whereas the material of the dummy transducer 230 is stationary. After all, regarding the echoes C', only the variation of the echoes C' is received by the receiver 240. Thus, a reflected image of high signal-to-noise ratio can be obtained by exploiting the reflection property of the acoustic wave.

Figure 1:
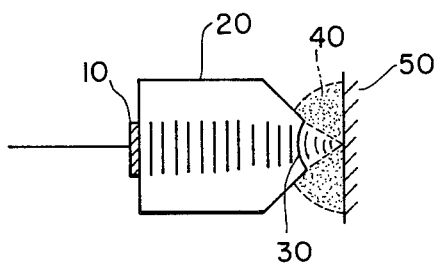
FIG. 1 is a diagram showing the construction of a prior-art transducer.
Figure 2:
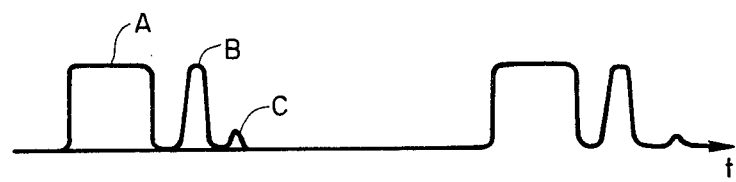
FIG. 2 is a diagram showing echo waveforms for explaining the operation of the prior-art transducer.
Figure 5:
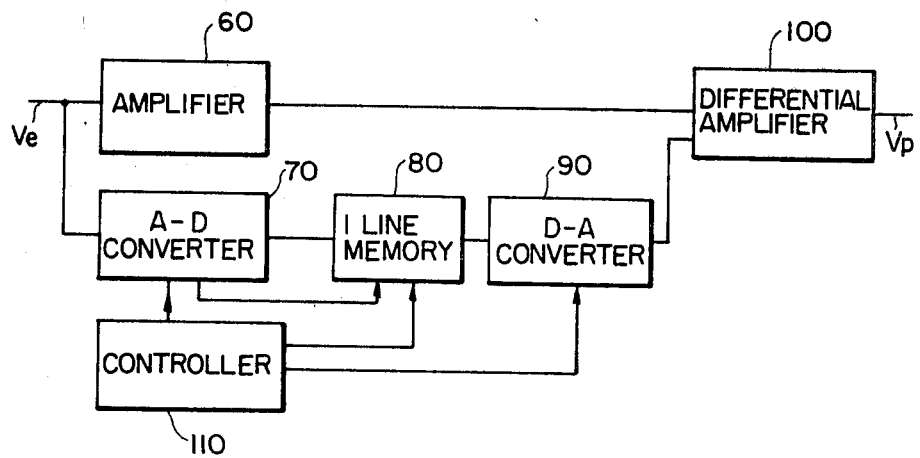
FIG. 5 is a diagram showing the construction of another embodiment of this invention.

FIG. 5 is a diagram showing the construction of another embodiment of this invention, and the embodiment is suitable for a case of eliminating unwanted signals in a video frequency range. A video signal $V_e$ based on the reflected wave from the acoustic transducer as shown in FIG. 1 is received by a buffer amplifier 60, whereupon the output is digitized by an analog-to-digital converter 70 and then stored in a 1-line memory 80. In the next cycle, the digital value is analogized by a digital-to-analog converter 90, and the difference $V_p$ between the analog value and the output of the amplifier 60 is taken out by a differential amplifier 100. In this way, the received signal corresponding to one cycle of the echoes occurring repeatedly is stored and is compared with that corresponding to the next cycle, and only the difference between both the received signals can be provided as the picture signal $V_p$. Accordingly, the unwanted signals A and B which are not varied by the repetition are eliminated. Here, when the content of the memory from which a portion corresponding to the echo C has been deleted is supplied for the digital-to-analog conversion, the echo C itself is obtained as the difference $V_p$, and when the digital-to-analog conversion is executed without deleting the content, the difference with time (time differentiation) of the echo C is obtained.

In FIG. 5, numeral 110 indicates a controller for the whole device.

As set forth above, this invention can sharply reduce echoes unnecessary for, and being an obstacle to, the detection of a reflected echo from a specimen, and it is greatly contributive to the enhancement of the signal-to-nose ratio and the expansion of the dynamic range in an acoustic microscope etc. Therefore, it can achieve the improvement of the picture quality and can sharply enhance the performance of the equipment.

We claim:

1. In an ultrasonic imaging equipment wherein an acoustic transducer which includes a first acoustic propagating medium, a piezoelectric member disposed at one end of said first acoustic propagating medium, a spherical hole formed at the other end thereof, and a second medium interposed between said spherical hole and a first specimen is used to obtain an ultrasonic image of said first specimen on the basis of a reflected wave from said first specimen, said acoustic transducer generating acoustic waves reflected from a boundary between said spherical hole and said second medium as a lens echo; the improvement comprising dummy acoustic transducer means comprising a third acoustic propagating medium, a piezoelectric member disposed at one end of said third acoustic propagating medium, a spherical hole formed at the other end thereof, and a fourth medium interposed between said spherical hole and a second specimen for generating acoustic waves reflected from a boundary between a spherical hole thereof and a medium proximate to said spherical hole as a lens echo identical to the lens echo of said first-mentioned acoustic transducer, wherein the second specimen is an acoustic absorber whose reflection of acoustic waves is substantially less than the reflection of said first specimen and means for providing a difference between the reflected lens echo from said first-mentioned acoustic transducer and the lens echo from said dummy acoustic transducer means so that the unwanted lens echo from said first-mentioned acoustic transducer is substantially eliminated by said dummy acoustic transducer means.

2. An ultrasonic imaging equipment as defined in claim 1, wherein said means for providing said difference is a bridge circuit, which has its one side termination supplied with said lens echo from said first-mentioned acoustic transducer and has its other side termination supplied with said lens echo from said dummy acoustic transducer means.

3. An ultrasonic imaging equipment as defined in claim 1, wherein said first-mentioned acoustic transducer and said dummy acoustic transducer means each provide a positive lens formed by the boundary between said spherical hole thereof and said medium proximate thereto.

4. An ultrasonic imaging equipment comprising a pulsed electrical source of RF energy, an acoustic transducer including a first acoustic wave propagating medium, a piezoelectric member coupled to said source and being disposed at one end of said first medium, and a spherical recess formed at the other end of said first medium, a second acoustic wave propagating medium interposed between said spherical recess and a specimen to be imaged, means for obtaining an ultrasonic image of said specimen in accordance with an electrical signal generated by said acoustic transducer in response to an acoustic wave reflected from said specimen, said electrical signal generated by said acoustic transducer including parasitic peaks, dummy acoustic transducer means coupled to said source and generating an electrical signal in response to an acoustic wave reflected from an acoustic absorber, wherein the acoustic absorber has substantially less reflection of acoustic waves than said specimen, said electrical signal of said dummy acoustic transducer means including parasitic peaks identical to the parasitic peaks of the electrical signal generated by said acoustic transducer, and means for providing a signal corresponding to the difference between the signals from said acoustic transducer and from said dummy acoustic transducer means which difference signal is substantially free of the parasitic peaks.

5. An ultrasonic imaging equipment as defined in claim 6, wherein said dummy acoustic transducer means includes a first acoustic wave propagating medium, a piezoelectric member coupled to said source and being disposed at one end of said first medium, and a spherical recess formed at the other end of said first medium and further comprising another acoustic wave propagating medium interposed between said spherical recess and said acoustic absorber, said second medium and said another medium having a lower acoustic wave velocity than said first medium of said acoustic transducer and said dummy acoustic transducer means, respectively, said acoustic transducer and said dummy acoustic transducer means providing a positive lens formed by the boundary of said spherical hole thereof and said second medium and said another medium, respectively.

6. The ultrasonic imaging equipment as defined in claim 1 wherein said first and third acoustic propagating mediums have the same properties.

* * * * *